Feb. 15, 1966   E. V. PAINTER ET AL   3,235,088
FILTER HOLDER
Filed Jan. 3, 1962   3 Sheets-Sheet 3
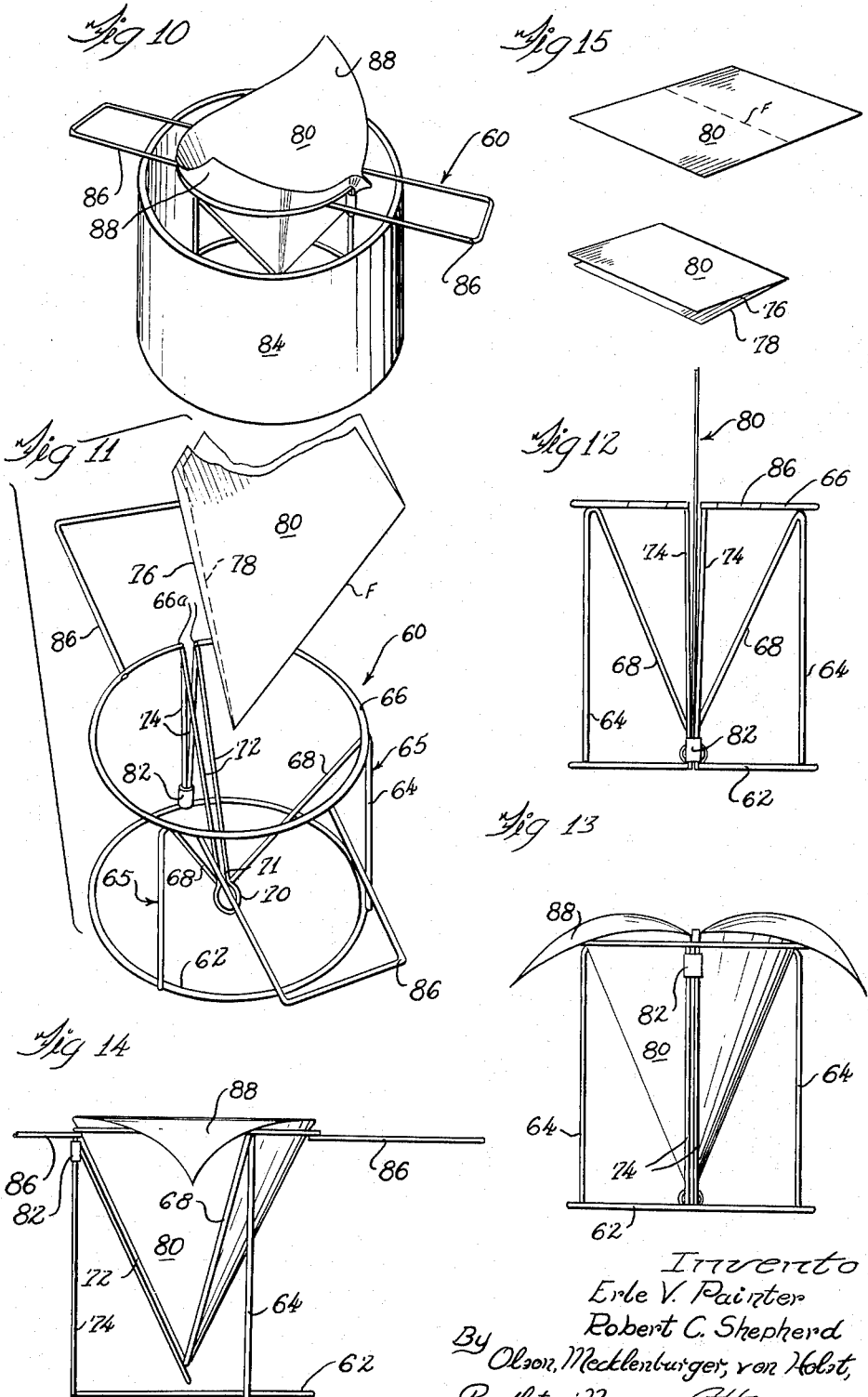
Inventor
Erle V. Painter
Robert C. Shepherd
By Olson, Mecklenburger, von Holst,
Pendleton & Neuman Attorneys

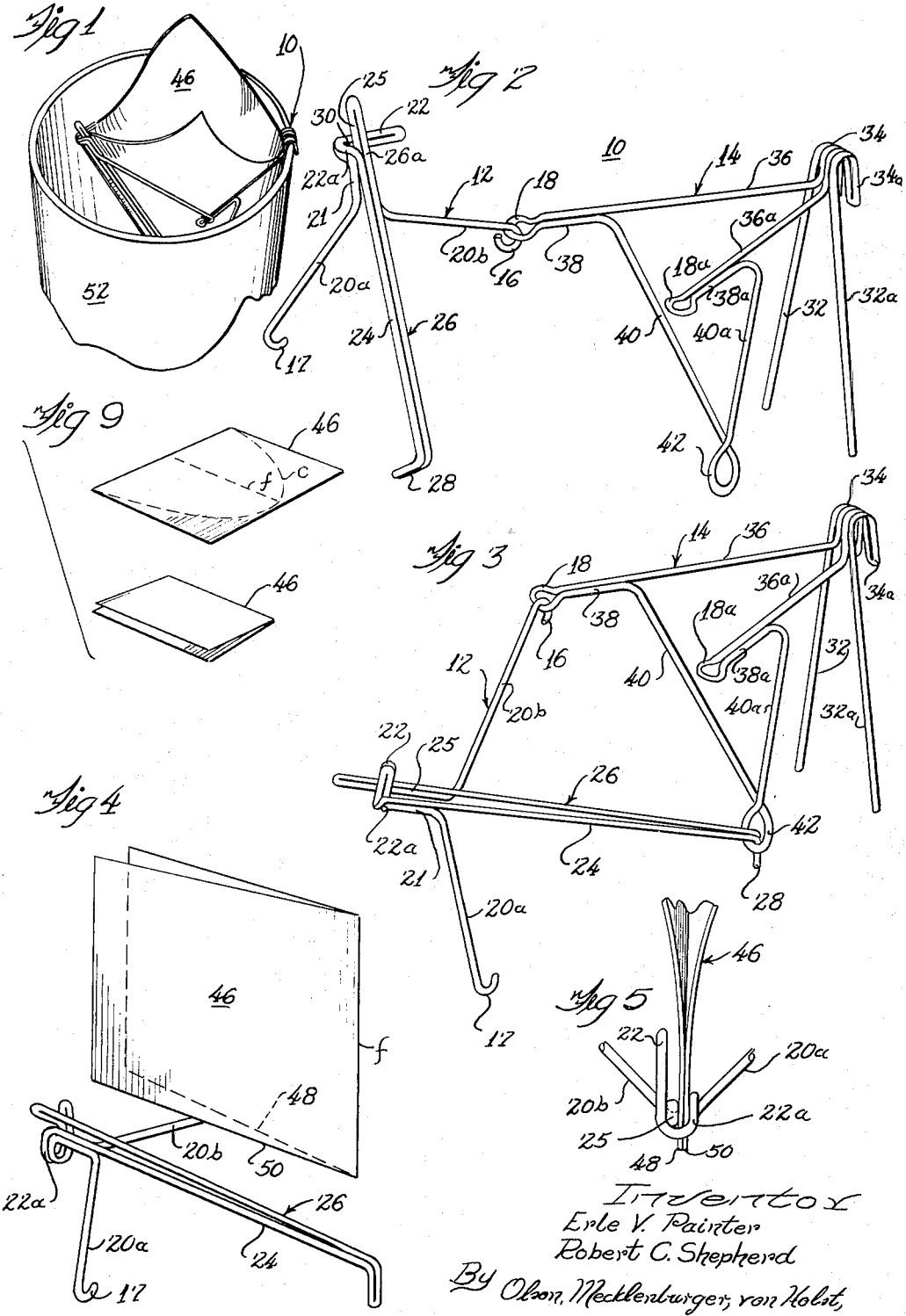

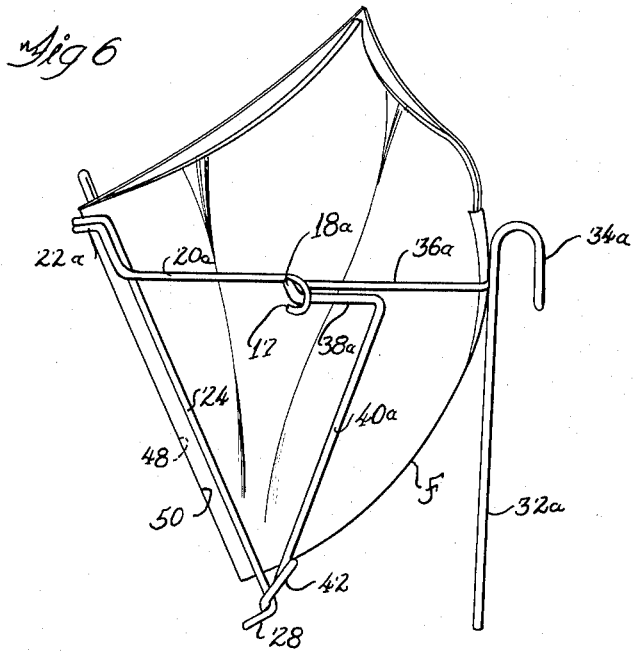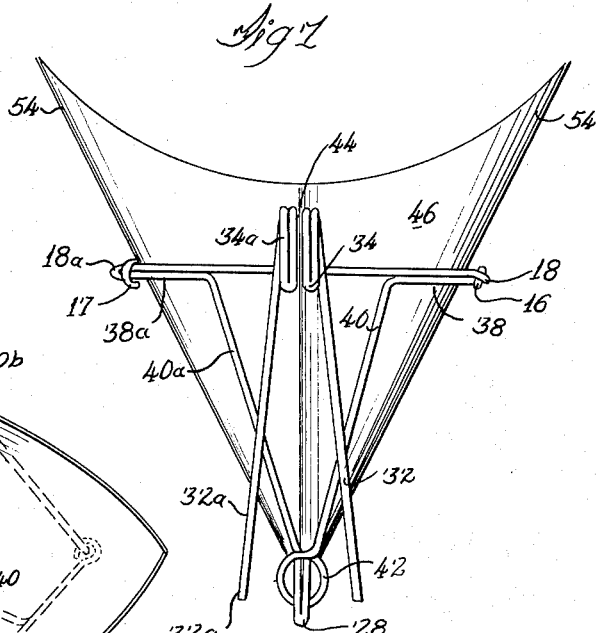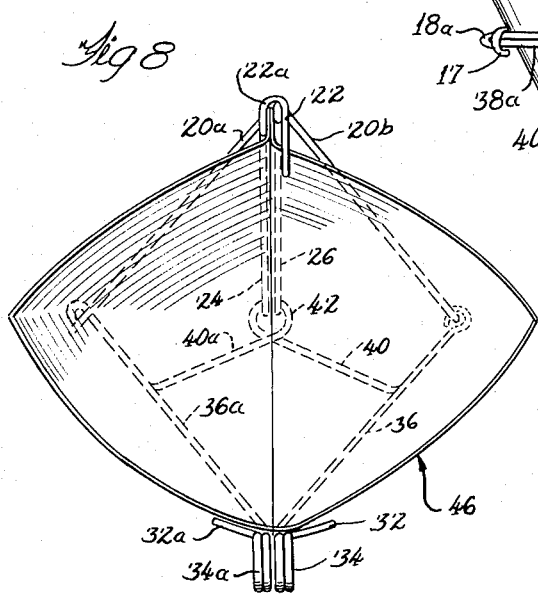

United States Patent Office 3,235,088
Patented Feb. 15, 1966

3,235,088
FILTER HOLDER
Erle V. Painter, La Grange, and Robert C. Shepherd, Oak Lawn, Ill., assignors to Johnson & Johnson, a corporation of New Jersey
Filed Jan. 3, 1962, Ser. No. 164,086
12 Claims. (Cl. 210—485)

This invention relates to an improved filter holder, and more particularly to an improved holder employing a novel clamp support which requires only a single-folded sheet of filter material to function efficiently.

In the course of filtering solids and other suspended matter from liquids on a small scale, it has been a common practice to employ a filter paper element in sheet form. The sheet is generally folded into a conical configuration for reception on the interior surface of a correspondingly conical filter holder or funnel which is disposed with the apex lowermost in the normal position of use.

The above-described paper filter cone is generally folded so that a plurality of paper thicknesses is disposed over at least a portion of the filter holder surface. Such plurality of thicknesses had heretofore been deemed necessary to insure the absence of any opening or slit through which the suspended material may pass with the liquid filtrate. The well-known chemical laboratory filter in which a sheet of filter paper is twice folded into quarters is illustrative of such a cone. In formation of a laboratory filter, a filter is double folded, after which the paper is opened with one thickness on one side and three on the other.

In an effort to dispense with double-folding operations and also reduce the amount of filter material necessary for each filtering operation, single-thickness conical filters have been devised to interfit with a conical holder surface. These latter filters employ sewn or glued seams which oftentimes perform unsatisfactorily. The glued filter seam portions are subject to separation, and solids sometimes pass through the needle holes of the sewn seams.

The filter holders hereinafter described are adapted for home and restaurant use and are particularly adapted for the straining of food particles from reuseable oils or shortening employed in the deep-fat frying of many foods, such as chicken. As restaurant cooks and housewives both well know, unless the grease employed in deep frying is strained free of food particles following use thereof, such particles will serve as a contaminating agent eventually rendering the grease rancid and unfit for further use.

It is an object of this invention, therefore, to provide a filter holder employing a novel clamp-support portion which enables a flat rectangular filter element to be efficiently employed.

It is a further object of this invention to provide an improved filter holder construction which is readily portable and inexpensive to manufacture.

It is still a further object of this invention to provide an improved filter holder construction employing a plurality of hinged portions which may be collapsed into a small volume for shipping and storage purposes.

It is another object of this invention to provide an improved method of forming a conical filter from a flat rectangular filter element requiring but one fold, whereby upper portions of such formed filter may be formed for self-supporting purposes.

Another object is the provision of a filter holder employing a novel clamp-support which is readily engageable and disengageable with free edge portions of a filter member.

It is still another object of this invention to provide an improved compact filter holder construction which requires a minimum of filter material for efficiently performing a filtering operation without employing glued or sewn filter seams.

Further and additional objects of this invention will appear from the following description, the appended claims and accompanying drawings.

In one form of this invention, a plurality of downwardly converging filter supports are mounted at their upper ends on two hinged rim defining portions which, in the interlocked condition, define a continuous upper periphery. One of the filter supports comprises two clamping arms joined at their lower ends and formed so as to hingedly engage the lower terminal portions of the remaining filter supports. One of the clamping arms has a clasp portion formed therein whereby said clamping arms may be rendered parallel and locked in tight clamping engagement after the free ends of a filter have been inserted therebetween.

In a modified filter holder construction, the filter support-clamping arms are joined to split rim portions which are in turn connected to downwardly converging elongate support arms. A slidable ferrule is engageable with upper portions of the converging support arms, whereby the clamping arms connected thereto may be urged into tight clamping engagement.

For a more complete understanding of this invention, reference will now be made to the accompanying drawings wherein:

FIGURE 1 is a fragmentary perspective view illustrating one embodiment of the filter holder of this invention disposed within a storage receptacle in assembled relationship with a filtering element;

FIG. 2 is a perspective view of two hingedly connected portions of the filter holder of FIG. 1 in disassembled relationship;

FIG. 3 is a perspective view of the filter holder portions of FIG. 2 in the first step of engagement prior to effecting a completely assembled relationship for use;

FIG. 4 is a perspective view illustrating the manner in which a filter element is inserted in place in the clamp portion of the filter holder illustrated in FIG. 3;

FIG. 5 is a fragmentary top plan view of the filter element and clamping portion of the illustrated filter holder after the filter element has been clamped in place;

FIG. 6 is a side elevational view of one embodiment of the filter holder provided by this invention in assembled relationship with a collapsed filter element;

FIG. 7 is an elevational view taken at right angles to FIG. 6, but illustrating the filter element in an open condition;

FIG. 8 is a top plan view of the filter holder-filter element assembly of FIG. 7;

FIG. 9 comprises two views illustrating the manner in which the filter element is half-folded prior to use thereof with the filter holder illustrated in FIGS. 1 through 8;

FIG. 10 is a perspective view illustrating a modified filter holder construction formed in accordance with the teaching of this invention, in assembled relationship with a filter element, supportably disposed atop the peripheral edge of a container;

FIG. 11 is a fragmentary perspective view illustrating a filter element in the process of being clamped in position in the filter holder illustrated in FIG. 10;

FIG. 12 is a side elevational view, with a filter holder handle portion partly broken away, illustrating a filter element in a collapsed unopened condition after the same has been inserted in the clamping portion of the modified filter holder of FIGS. 10 and 11;

FIG. 13 is a view similar to FIG. 12, illustrating the filter element in the opened condition and illustrating a clamping ferrule in a raised clamping position;

FIG. 14 is a fragmentary elevational view taken at right angles to FIG. 13; and

FIG. 15 comprises two views illustrating the manner in which the filter element employed with the modified filter holder construction of FIGS. 10 through 14 is half-folded prior to engagement with said filter holder.

*Filter holder of FIGS. 1 through 8*

Referring now to the drawings, and more particularly to FIG. 2, a filter holder 10 is therein illustrated composed of two discrete portions or elements 12 and 14, which are maintained in connected relationship by means of hook 16 of holder element 12, which pivotally engages loop 18 of holder element 14. The two holder elements may be maintained in permanent engagement by means of the latter connection.

Holder element 12 is formed from a single piece of wire which is bent to form two rim defining portions 20a and 20b. Hook 16 defines the terminal of the rim defining portion 20b; hook 17 defines the distal end of rim defining portion 20a, although the terminal end portion thereof does not curve to the same extent as that of hook portion 16 toward the rim with which it is integrally formed.

The proximal end of rim defining portion 20a is connected by means of riser 21 to a clasp 22 formed of double wire thickness, which in turn is connected with an elongate clamping arm 24.

Clamping arm 24, as is clearly illustrated in FIG. 2, is joined at the bottom end thereof with clamping arm 26, the juncture between the latter clamping arms defining a projecting finger 28. The two clamping arms 24 and 26 are in tightly abutting relationship at their lower ends in the vicinity of projection 28.

Although arms 24 and 26 are illustrated in FIG. 2 as being formed from a single continuous piece of wire and such construction has obvious advantages of simplicity and a minimum number of parts, it should be noted that for purposes of this invention, two discrete arms similar to arms 24 and 26, welded or otherwise similarly joined together at their lower ends, will perform in a satisfactory manner for the purposes hereinafter described.

The wire piece forming the previously described portions of the filter holder element 12 continues from the upper end of clamping arm 26 and is bent downwardly upon itself to form a link 25 parallel to arm 26. The wire is formed at the lower end of link 25, as illustrated in FIG. 2, to provide contiguous rim defining portion 20b.

The clasp 22 of filter holder element 12 is formed into a bight with clasp base 22a to define a clamping recess 30 within which clamping arm 26 may be retained. The interval between clasp 22 and base 22a defining the recess 30 is such that when clamping arm extension 26a is urged into recess 30, it is frictionally retained therein. The clamping arms 24 and 26 are then in a parallel condition and in tightly abutting relationship along the entire length thereof.

Filter holder element 14 of holder 10 is also preferably formed from a single continuous piece of wire. Vertical support 32 is bent to form a hook 34, more clearly seen in FIG. 7. Hook 34 has a terminal end bent in the manner illustrated in FIG. 2, and hook 34 is contiguous with holder rim defining portion 36 with which loop 18 is integrally formed.

The single wire which forms loop 18 extends back upon itself to form connector 38 which is joined, as illustrated in FIG. 2, with inclined filter support arm 40. The lower end of support arm 40 is contiguous with a loop 42 which is, in turn, contiguous with a support arm 40a.

Arm 40a is symmetrical with support arm 40 and is contiguous with connector 38a, which is, in turn, contiguous with loop 18a joined to rim defining portion 36a. The latter rim defining portion is contiguous with hook 34a and the latter hook, in turn, is joined to vertical holder support 32a, as illustrated in FIG. 2. It will be noted from FIG. 7 that hooks 34 and 34a may be welded or soldered at 44, so as to assure a more rigid assembly.

Filter holder element 14 is, therefore, seen to comprise two twin halves formed from a single continuous piece of wire. The twin portions of the two halves bear the same identifying numerals and are distinguished from each other by means of the suffix *a*.

In the disassembled condition of FIG. 2, the support elements 12 and 14 will fit into a box, together with a supply of filters, which is only slightly larger than the box normally required to hold the filters alone. Hook 16 may be so completely closed as to prevent disengagement from loop 18 with which pivotally engaged or sufficiently open to permit disengagement of the parts for more efficient storage.

*Method of assembling filter holder of FIGS. 1 through 8*

In the normal course of assembling the holder elements 12 and 14 into a position of use, the following steps are employed:

Projection 28 of holder element 12 is inserted in loop 42 in the manner illustrated in FIG. 3. In this condition the filter holder 10 is ready for clamping engagement with a filter element, such as element 46 illustrated in the two views of FIG. 9.

The filter element may be composed of a rayon-cotton mixture, which is formed on a foraminous barrier in accordance with the method disclosed in our co-pending application Serial No. 819,757, filed June 11, 1959 and now abandoned, in which we are co-applicants with Fred K. Mesek, George L. Weir and William R. Strickel.

Although the filter element may be formed in accordance with our co-pending application, it may also comprise any sheet material having the attributes of a good filter. A good filter should provide substantial structural strength and minimum resistance to the flow of filtrate while avoiding the clogging of the filter pores in the course of efficiently removing the solid or suspended material.

It will be seen from FIG. 9 that the filter material 46 intended for use with the filter holder of FIGS. 1 through 8 comprises a rectangular sheet of a filter medium which is preferably twice as long as it is wide. Upon centrally folding or half-folding such sheet at the fold line *f*, illustrated in FIG. 9, the sheet 46 is composed of two square half portions and is then ready for engagement with filter holder 10.

FIG. 4 illustrates the manner of inserting sheet 46 into engagement with the clamping arm supports 24 and 26 of holder element 12. One end of the fold of the filter element 46 is threaded between clamping arms 24 and 26 and contiguous free edges 48 and 50 of the filter 46 slidably moved downwardly between the clamping arms until the end of the fold is stopped from further movement by a portion of loop 42 which engages an adjacent filter fold portion in the manner most apparent from FIG. 6.

During the threading operation, the fold line *f* is maintained substantially normal to the clamping arms 24 and 26, whereby the free edge portions 48 and 50 of the filter element 46 will remain substantially parallel to the latter clamping arms. Free edges 48 and 50 preferably should project a small distance, such as a quarter of an inch, beyond the parallel clamping arms as illustrated in FIG. 6.

After free edges 48 and 50 are properly disposed relative to clamping arms 24 and 26, upper portion 26a of clamping arm 26 is moved into recess 30 of clasp 22 and firmly locked in position, whereby clamping arms 24 and 26 tightly urge the engaged interposed portions of free edges 48 and 50 together, as illustrated in FIG. 5. The clamping engagement effected by arms 24 and 26 is such that suspended solids in the material being filtered are not able to pass through the clamped seam in filter material 46.

Following the filter element engagement, hook 17 of holder element 12 is moved into interlocking engagement with loop 18a in the manner most clearly seen in FIG. 6. Loop 18 of holder 10 is upwardly inclined to the horizontal in such manner that a frictional engagement is effected with hook 16 when hook 17 is pivoted to engage loop 18a. This frictional engagement assists in effecting a stable construction free of undesired relative movement between the holder portions 12 and 14.

As seen from FIG. 8, after the rim locking step, rim defining portions 20a and 20b of holder element 12 and rim defining portions 36 and 36a of holder element 14 define a continuous periphery or rim about the enclosed filter material 46. In the normal position of use, free edges 48 and 50 of filter 46, which are clamped between clamping arms 24 and 26, are in downwardly converging relationship with oppositely disposed fold line f (see FIG. 6). It is also seen from FIG. 6 that the filter holder 10 may stand erect on holder supports or supporting legs 32 and 32a and projection 28 defining the lower end of an apex defined by clamping arms 24 and 26 and filter support arms 40 and 40a.

After assembly, the collapsed walls of the filter element 46 are spread apart so as to form a downwardly tapering container, illustrated in top plan view in FIG. 8, and in side elevation in FIG. 7. In the normal position of use, the holder 10 and assembled filter element 46 would be suspended within a filtrate container, such as container 52 illustrated in FIG. 1, by means of the hooks 34 and 34a. In the latter position a liquid which contains solids, such as grease which has been used for deep fat frying, is passed through the filter whereby the clear grease filtrate passes through the element 46 into the container, and the contaminating food particles are retained on the surface of the filter material.

Filter 46 may be readily released from holder 10 by merely withdrawing clamping arm 26 from interlocking engagement with clasp 22. The filter 46 may then be manually grasped and lifted from the holder for disposal, residue recovery or the like.

It is seen from FIGS. 6, 7 and 8 that support is given to the open filter element not only by supporting arms 40 and 40a, but also by clamping arms 24 and 26 which serve the dual function of clamping the free edges 48 and 50 of the filter element together, as well as supporting a portion of the filter element in the normal course of use. Filter holder 10 enables a single-folded, rectangular piece of filtering media to efficiently function as a filter element. The surface area of such rectangular filter element is used to a maximum degree inasmuch as a single filter element thickness performs an efficient filtering function.

The opposed upwardly projecting filter element portions 54 may be eliminated if the element 46 were peripherally cut along curved line c illustrated in the top view of FIG. 9. However, there are certain distinct advantages in using the rectangular material. Inasmuch as the border portion removed from the rectangular sheet illustrated in FIG. 9 would probably constitute waste, and since an additional cutting operation would be required, it may at times be more economical to allow the filter element to retain the rectangular shape illustrated in FIG. 9. The border portion is used to advantage as a supporting member when large quantities of liquid are filtered, as will be described in greater detail.

*Modified filter holder of FIGS. 10 through 14*

FIGS. 10 through 14 illustrate an alternate filter holder which is well adapted to support a filter element having a larger effective filtering surface area than that usually employed with the filter holder of FIGS. 1 through 8. Holder 60 of FIG. 10 is primarily intended for use in restaurants or the like where large quantities of grease must be filtered daily in the normal course of kitchen operation.

It will be noted from FIG. 11 that holder 60 comprises an integral member having a base ring 62. Inverted V-shaped elements 65 are composed of substantially vertical supports or standards 64, which are spot-welded or otherwise secured to ring 62 at their lower ends and welded at their upper ends to spaced portions of split rim 66 which they support. The vertical standards 64 of V-shaped members 65 are formed integrally with downwardly converging filter-supports 68, which are welded or otherwise suitably affixed at their lower ends to a loop 70 which is the bight of two integral inclined filter clamps 72. The latter clamps are contiguous at their lower ends and welded or otherwise suitably affixed at their upper ends to terminal portions 66a of the rim 66.

Twin uprights 74, which may be formed integrally with the ends of clamps 72 converge downwardly and are welded or otherwise secured to a point on ring 62 intermediate the interval defined by the overlying spaced ends 66a of the filter holder rim 66.

The lower ends of the uprights 74, which may be separate elements or integrally formed with clamps 72, as illustrated, are in abutting relationship at their lower ends, as may be seen from FIG. 13. It is the function of clamps 72 to urge together the free edges of a filter sheet in the manner already described with respect to FIGS. 1–9.

Filter holder 60 is intended to utilize a filter element comprising a rectangular sheet of filtering media, such as is formed in accordance with the teaching of co-pending application Serial No. 819,757 filed June 11, 1959 and now abandoned. Rectangular filter element 80, shown in FIG. 15, is illustrative of an element suitable for use with filter holder 60. Such filter is preferably of rectangular configuration and is twice as long as it is wide.

In the normal course of using filter element 80, the same is half-folded into twin squares. The folded sheet is inserted in the holder so that two free edges, such as edges 76 and 78 of the filter element contiguous with fold line f are adjacently disposed to fold line f and in the normal position of assembly with the filter holder are on opposite sides of the conic defined thereby. To effect such relative disposition an end of the fold line f is threaded between the clamp support arms 72 and free edges 76 and 78 and slidably inserted therebetween so that a slight portion, a quarter of an inch or so, projects beyond arms 72 in the manner illustrated in FIG. 14.

The filter sheet edges 76 and 78 should not pass beyond the lower ends of clamping arms 72 into loop 70 since any sheet edge portions disposed within the loop will be free of any clamping action urging the same together. A ferrule, spot weld, such as weld 71 illustrated in FIG. 11, or other safety stop may be employed to assure proper disposition of the lower filter edge portions.

After the filter element has been inserted in the manner illustrated in FIG. 12, ferrule 82 which slidably engages uprights 74 is elevated from the lower position shown in FIGS. 11 and 12 into the elevated position of FIGS. 13 and 14. In the course of this slidable movement the diverging uprights 74 and the contiguous clamps 72 will be urged together in such manner that the edges of the filter element 80 contacting the clamps 72 are tightly urged together in abutting relationship along their entire length. The clamping action effected by arms 72 is such that no solids or other suspended matter in the liquid being filtered are able to pass between said arms with the filtrate.

An appropriately shaped ferrule or other slidable means equivalent to ferrule 82 of the drawings may be so formed as to directly engage the clamp arms 72 without interfering with those edge portions 76 and 78 of filter element 80 which project beyond the clamp arms 72.

FIG. 10 illustrates filter holder 60 in a position of use supported on the top edge of a filtrate container 84 by means of transverse handles 86. Handles 86 are of rectangular configuration and welded or otherwise suitably affixed to opposed peripheral portions of the holder rim 66.

Inasmuch as filter holder 60 is intended for use where large volumes of liquids are filtered, additional support may be rendered to the effective filtering surface area of filter element 80 by bending opposed triangular portions 88 of filter element 80 over underlying rim portions of the holder, in the manner illustrated in FIG. 13. The bent triangular filter portions will assist the clamp arms 72 and the twin supports 68 in retaining the effective surface area of filter element 60 in a desired position and conic configuration during use.

Filter element 80 may be readily released from its clamped engagement with the holder 60 merely by moving ferrule 82 into the position illustrated in FIGS. 11 and 12 after the filtering operation has been completed.

While two particular embodiments of this invention have been described in detail hereinabove, it will be noted that various modifications may be made without departing from the spirit and scope of this invention. For example, the specific number of filter supporting elements which define in part the surface area of a downwardly tapering figure, such as an inverted cone or pyramid, is immaterial. For purposes of economy, the specific number of supporting elements is that which will effectively support the filter elements throughout the filtration. Although the above-described filter holders and cooperating filter elements have had their intended uses relate to the filtering of frying greases, it should be understood that the provided filter holder constructions are intended for any application in which it is desired to separate suspended matter from a liquid by means of a cone-like filter sheet.

The foregoing description has set forth in detail two embodiments of a filter holder construction in which a novel support for a filter has served dual support and clamping functions. The novel clamping action described in the two embodiments enables a simple once-folded rectangular sheet of filtering media to efficiently function in the course of a filtering operation. The novel filter holders above described do not require the use of glue or sewn filter edges and make efficient use of the surface area of a rectangular sheet of filter media whereby such sheet area may be employed in a single thickness for filtering purposes. Despite such efficient use, the filtering element area and the novel clamping action provided by the holders described prevent passage of any solid material into the filtrate.

Without further elaboration, the foregoing will so fully explain the character of our invention that others may, by applying current knowledge, readily adapt the same for use under varying conditions of service, while retaining certain features which may properly be said to constitute the essential items of novelty involved, which items are intended to be defined and secured to us by the following claims.

We claim:

1. In a holder for a sheet filter having a filtering surface area adapted to remove contaminants from a liquid the combination comprising a rim, a plurality of spaced convergent supporting means extending from said rim for supporting the filtering surface area of said filter, one of said supporting means comprising two adjacent elongate clamping means, and means adapted to urge said clamping means into abutting engagement whereby free edges of such filter disposed therebetween are tightly urged together preventing contaminants in the liquid being filtered from passing between the clamping means.

2. In a holder for a filter, the combination comprising a rim, a plurality of spaced supporting means extending from said rim and defining in part the surface configuration of a downwardly tapering figure, the lowermost ends of said supporting means converging to define substantially a point, one of said supporting means comprising a pair of adjacent elongate clamping arms joined at one end, and means connected to said clamping arms adapted to urge other ends of said elongate arms into abutting, clamping engagement.

3. In a holder for a filter, the combination comprising a rim, a plurality of spaced supporting means extending from said rim, said supporting means defining in part the surface configuration of a downwardly tapering figure, the lowermost ends of said supporting means converging to define substantially a point, one of said supporting means comprising a pair of adjacent elongate clamping arms joined at their lower ends in the vicinity of said point, said elongate clamping arms having diverging extensions angularly disposed to each other; and means slidably engaging said extensions and adapted to urge the diverging extensions of said clamping arms into tight, clamping, parallel relationship.

4. In a holder for a filter, the combination comprising a rim, a plurality of spaced supporting means extending from said rim, said spaced supporting means defining in part the surface configuration of a downwardly tapering figure, the lower ends of said supporting means converging to a point of connection, one of said supporting means comprising a pair of upwardly diverging elongate clamping arms joined at their lower ends in the vicinity of said point, and clasp means formed integrally with a portion of one of said clamping arms at a point spaced from the junction of said two clamping arms adapted to engage the other of said clamping arms and urge said clamping arms into parallel, abutting, clamping engagement.

5. In a holder for a sheet filter, the combination comprising a plurality of spaced filter supporting means defining in part the surface configuration of a downwardly tapering figure, a rim defining an upper peripheral portion of said holder, each of said filter supporting means depending from said holder rim, a plurality of spaced rim suport means depending from said rim, the lower end portions of said filter supporting means converging at a point disposed in a plane substantially parallel to said rim and passing through the lower ends of said rim support means; one of said filter supporting means comprising two elongate clamping arms adapted to receive a free edge of such a sheet filter folded upon itself therebetween, and means connected to said clamping arms for urging the same into juxtaposed parallel relationship whereby such filter edge is clamped therebetween.

6. In a holder for a filter, the combination comprising a discontinuous rim having spaced rim portions, having a plurality of supports depending from said rim whereby said rim may be supportably positioned in a substantially horizontal plane on a support surface, a plurality of downwardly converging filter support means connected to said rim at one end and converging at a point disposed below the level of said rim at the other end, one of said filter support means comprising spaced, upwardly diverging elongate clamping arms adapted to be urged into tightly-abutting, parallel relationship, said elongate clamping arms being contiguous with said spaced rim portions, a pair of adjacent, downwardly-converging rim supports connected to said clamping arms; and adjustable means engageable with said downwardly converging rim supports whereby said depending rim supports and said elongate clamping arms are urged into parallel, tightly abutting relationship.

7. In a holder for a filter, the combination comprising two hinged elements each containing two rim-defining portions one of the rim-defining portions in each of said hinged elements having a free end, said free ends adapted to effect interlocking engagement with each other so as to define a continuous rim formed of said rim-defining portions, filter-supporting means supportably connected to one of said rim defining portions, said filter-supporting means having a distal portion terminating at a point disposed below the approximate center of the area enclosed by said rim in the normal condition of filter assembly, said filter-supporting means comprising a pair of substantially parallel, elongate clamping arms connected at the bottom ends thereof; clasp means connected to one of said elongate clamping arms at a point spaced from the connection between said elongate arms, the other of said clamping arms being engageable with said clasp means whereby said clamping arms are concomitantly urged into parallel, tightly-abutting relationship.

8. The holder of claim 7 in combination with an inverted hook means connected to a rim defining portion of said holder whereby said holder may be supported on a supporting wall.

9. In a holder for a filter, the combination comprising two hinged elements each containing two rim-defining portions one of the rim-defining portions in each of said hinged elements having a free end, said free ends adapted to effect interlocking engagement with each other so as to define a continuous rim formed of said rim-defining portions, when assembled, a plurality of filter supporting means connected to said rim defining portions, said filter supporting means having end portions downwardly converging to a base point disposed below the level of said rim, one of said downwardly converging filter-supporting means comprising a pair of substantially parallel, elongate clamping arms connected at the bottom ends thereof; clasp means connected to one of said elongate clamping arms at a point spaced from said base point, the other of said clamping arms being engageable within said clasp means whereby said clamping arms are concomitantly urged into parallel, tightly-abutting relationship; the bottom ends of said connected elongate clamping arms and the bottom ends of the remaining converging filter-supporting means being appropriately formed whereby the ends of the clamping arms may hingedly engage the ends of said filter-supporting means when said rim defining portions are in interlocking engagement.

10. In a holder for a filter, the combination comprising two hinged elements each containing two rim-defining portions one of the rim-defining portions in each of said hinged elemets having a free end, said free ends adapted to effect interlocking engagement with each other so as to define a continuous rim formed of said rim-defining portions, a plurality of spaced filter-supporting means defining a downwardly tapered configuration and supported at their upper ends by said rim defining portions; one of said filter- supporting means comprising a pair of elongate clamping means adapted to engage each other in abutting relationship along their entire length, said pair of elongated clamping means being connected together at their lower ends and angularly disposed with respect to each other; the other filter supporting means being joined at their bottom ends and being so formed at their juncture so as to hingedly receive the projection of said elongate clamping means.

11. The holder of claim 10 in which each of said hinged elements is formed from a single, continuous, deformable member.

12. In a filter holder, the combination comprising two hinged elements each containing rim-defining portions, a rim-defining portion of one element having a loop defining one end thereof, and a rim-defining portion of the other element having a hook defining one end thereof, said hook and loop being in hinged engagement, the hingedly connected elements having distal ends adapted to effect interlocking engagement whereby a continuous support is defined by said rim-defining portions in the normal position of assembly; a plurality of spaced filter supporting means defining a downwardly tapered configuration and supported at their upper end portions by said rim defining portions; one of said filter supporting means comprising a pair of elongate clamping means adapted to tightly engage each other in abutting relationship along there entire length, said pair of elongate clamping means being connected together at their lower ends and forming a projection angularly disposed to the remaining portions of said clamping means; said other filter supporting means being joined at their bottom end portions and being so formed at their juncture so as to hingedly receive the projection of said elongated clamping means.

References Cited by the Examiner

UNITED STATES PATENTS

| 1,322,378 | 11/1919 | Vaughn | 210—485 |
| 1,773,927 | 8/1930 | Mills | 210—485 X |
| 2,171,484 | 8/1939 | Squire | 210—497 |

REUBEN FRIEDMAN, *Primary Examiner.*

HERBERT L. MARTIN, *Examiner.*